United States Patent [19]
Brown et al.

[11] 3,897,512
[45] July 29, 1975

[54] OLEFIN DIMERIZATION PROCESS

[75] Inventors: Melvin Brown, Akron; Henry R. Menapace, Stow; Neil A. Maly, Tallmadge, all of Ohio

[73] Assignee: The Goodyear Tire & Rubber Company, Akron, Ohio

[22] Filed: Oct. 9, 1973

[21] Appl. No.: 404,559

Related U.S. Application Data

[63] Continuation-in-part of Ser. No. 286,477, Sept. 5, 1972, abandoned, which is a continuation-in-part of Ser. No. 125,408, March 17, 1971, abandoned.

[52] U.S. Cl. .................... 260/683.15 D; 252/429 B
[51] Int. Cl. ............................................. C07c 3/10
[58] Field of Search ......................... 260/683.15 D

[56] References Cited
UNITED STATES PATENTS

| | | | |
|---|---|---|---|
| 3,318,860 | 5/1967 | Eichenbaum | 252/429 |
| 3,544,649 | 12/1970 | Dixon et al. | 260/683 |
| 3,558,518 | 1/1971 | Zuech | 252/429 |

*Primary Examiner*—Paul M. Coughlan, Jr.
*Attorney, Agent, or Firm*—F. W. Brunner; J. Y. Clowney

[57] ABSTRACT

There is disclosed a process for the dimerization or codimerization of α-olefins employing as a catalyst mixtures of (1) tungsten hexahalides or tungsten oxyhalides, (2) an organometallic compound and (3) certain nitrogen containing ligands.

8 Claims, No Drawings

OLEFIN DIMERIZATION PROCESS

This application is a continuation-in-part of application Serial No. 286,477, filed September 5, 1972, which was a continuation-in-part of application Serial No. 125,408, filed March 17, 1971, both now abandoned.

This invention is directed to a process for the dimerization and codimerization of olefins. More specifically, it is directed to the dimerization and codimerization of α-olefins by means of catalyst systems comprising tungsten halides or tungsten oxyhalides with an organometallic compound such as aluminum alkyl halides and certain nitrogen-containing ligands. It is also directed to the catalyst as a new compound.

By the term "dimerization", "dimer" or "dimerized" and the like, when employed in this application, is meant to denote that one molecule of an olefin is combined with another molecule of the same olefin to form a dimer. For instance, two moles of propylene are dimerized to form one mole of hexene.

By the term "codimerization", "codimer" or "codimerized" and the like, when employed in this application, is meant to denote that one molecule of an olefin is reacted with a molecule of a dissimilar olefin and these two olefins form a new olefin. For instance, when one mole of propylene is reacted with one mole of butene or ethylene, there is formed a heptene or a pentene.

According to the invention, olefins are dimerized or codimerized in the presence of a catlyst comprising a mixture of (1) a tungsten salt selected from the group consisting of tungsten hexahalides and tungsten oxyhalides, (2) a reducing agent selected from the group defined by the formulae:

$$R_nMX_{3-n}$$

and $$R_3M_2X_3$$

wherein $n$ is at least one and not more than two; X is a halogen and R is an alkyl radical containing from one to ten carbon atoms; and M is selected from boron, aluminum, gallium and indium; and (3) a ligand of the formula:

$$NR'R''R'''$$

wherein R' and R'' are selected from the group consisting of hydrogen, alkyl, cycloalkyl, aryl, alkenyl and alkaryl; R''' is selected from the group of hydrogen, alkyl and alkenyl and R', R'' and R''' may contain from 1 to 20 carbon atoms when not hydrogen, and when R', R'' and R''' are hydrocarbon, the hydrogen atoms attached to the carbon atoms may be mono- or polysubstituted by at least one member of the group selected from halogen, amino, nitro, cyano, alkoxy, carboxy and carboalkoxy and two members of R', R'' and R''' may be joined by carbon-carbon bonds to form a part of a heterocyclic saturated ring.

In the normal practice of this invention, it is usual to operate in a manner so that the best results are obtained. However, the molar ratio of the catalyst components to each other may vary. For instance, the molar ratio of the nitrogen ligand (N) to the molar ratio of the tungsten halide (W) may vary from about 1/1 to about 4/1. A molar ratio of N/W of about 1.5/1 to about 2.5/1 is more preferred. The molar ratio of the organometallic compound (Al) to the tungsten halide (W) may vary from about 3/1 to about 50/1. A molar ratio of Al/W of about 8/1 to about 30/1 is more preferred.

The amount of total catalyst used depends on various factors such as the purity of the reactants, the temperature; and pressures employed and the rate desired. One skilled in the art will be able to determine the amount needed, so long as a catalytic amount is employed. Results have been obtained by the use of as little as one mole of tungsten in the catalyst mixture to 150,000 moles of the α-olefin. Others may obtain further teachings as to amounts by reference to the examples.

In the practice of this invention, it is generally desirable to conduct the dimerization or codimerization as a continuous process. However, batch processes may be successfully employed. The temperature at which the dimerization or codimerization reaction of this invention is conducted depends somewhat on the reactants employed and the rate of reaction desired. Generally temperatures ranging from about 0°C. to about 150°C. are employed with about 0°C. to about 70°C. being more preferred and 10°C. to 50°C. being most preferred.

If a continuous process is employed, the rate at which the process is conducted, again, will depend on the temperature employed and the conversion desired. The rate is usually indicated as liquid residence times. In this invention residence times will vary from about 1 minute to 3 hours with 5 minutes to 1 hour being more preferred.

The pressure of the dimerization or codimerization process has not been found to be too critical and may vary broadly from about 0 to about 1000 pounds per square inch gauge (psig) with about 50 to about 500 psig being more preferred.

In the practice of this invention, it is usually desirable to employ pure olefins as the only reactants. However, it may be desirable to employ a diluent for such reasons as a heat transfer medium and the like. If a diluent is employed, it should obviously not react with either the reactant or the resulting products. Representative of such inert diluents may be the paraffin hydrocarbons such as hexane, pentane, propane, as well as other gases or liquids which are known to be inert. Also suitable are chlorobenzene, benzene and the like.

As has been stated previously, the catalyst employed is a three component system comprising (1) a tungsten salt selected from hexahalides of tungsten and the oxyhalides of tungsten. Representative examples of the tungsten hexahalides are tungsten hexachloride, tungsten hexabromide and tungsten hexafluoride. Representative of the tungsten oxyhalides are tungsten oxychloride, tunsten oxybromide and tungsten oxyfluoride.

The second catalyst component is an organometallic compound responding to the formulae:

$$R_nMX_{3-n}$$

or $$R_3M_2X_3$$

wherein $n$ is a whole number of at least one and not more than two; R is an alkyl radical containing from one to 10 carbon atoms; and X is a halogen such as chlorine, bromine, iodine or fluorine; and M is a metal from the group of boron, aluminum, gallium and indium. Representative of such compounds are ethylaluminum dichloride, diethylaluminum chloride, diisobutylaluminum bromide, propylaluminum diiodide, hexylaluminum bromide, diethylaluminum fluoride, decylaluminum diiodide, diheptylaluminum fluoride, ethylaluminum sesquichloride, ethylaluminum sesquibromide and the like. Also representative of the compounds useful in this invention are ethyl boron dichloride, diisobutyl boron bromide, hexyl boron iodide, diethyl boron fluoride, diheptyl boron chloride, ethyl boron sesquichloride, ethyl boron sesquibromide and the like. Also useful in this invention are the gallium and indium compounds as set forth above, where gallium and indium are substituted for aluminum and boron.

The third component of the catalyst may be represented by the formula:

NR'R"R''' wherein R' and R" are selected from the group consisting of hydrogen, alkyl, cycloalkyl, aryl, alkenyl and alkaryl; R''' is selected from the group of hydrogen, alkyl and alkenyl and R', R" and R''' may contain from 1 to 20 carbon atoms when not hydrogen, and when R', R" and R''' are hydrocarbon, the hydrogen atoms attached to the carbon atoms may be mono- or polysubstituted by at least one member of the group selected from halogen, amino, nitro, cyano, alkoxy, carboxy and carboalkoxy and two members of R', R", and R''' may be joined by carbon-carbon bonds to form a part of a heterocyclic saturated ring.

Representative of such compounds are ammonia, n-butylamine, chlorobutylamine, diethylamine, cyclohexylamine, 2-pentenylamine, cyclohexenylamine, aniline, N-methylaniline, diphenylamine, 2-, 3or 4-haloanilines, 2-, 3- or 4-alkylanilines, 2,4,6-trimethylaniline, triethylamine, 2,4,6-trichloroaniline, 2,6-dichloroaniline, 2,4,6-tribromoaniline, i-butylamine, dimethylamine, cycloheptylamine, 2,3,4-trifluoroaniline, 2,3-dinitroaniline, 3-isobutylaniline, 4-amino-3,5-dichlorobenzoic acid ethyl ester, 2,3,4,5,6-pentafluoroaniline, 2-, 3- or 4-methoxyaniline, 2,6-dichloro-4-cyanoaniline, 2-, 3- or 4- nitroaniline, 2-, 3- or 4- cyanoaniline, 3-butylaniline 2-, 43- or 4-carboxyaniline, 2,6-diisopropylaniline, 2-, 3- or 4-carbomethoxyaniline, 2-, 3- or 4-acetoxyaniline, 4-trifluoromethylaniline, 2,6-dimethyl-4-bromoaniline, 4-dimethylaminoaniline, 2-aminonaphthalene and other compounds wherein the R's are substituted as set forth above. Also, amines where the nitrogen atom constitutes a part of a heterocyclic saturated ring, representative of which are 4-methyl piperidine, piperidine, N-methyl piperidine and chloropiperidine.

The practice of this invention is further illustrated by reference to the following examples which are intended to be representative rather than restrictive of the scope of the invention.

EXAMPLE I

In the following experiments, 0.02 mole of propylene was dissolved in 40 cubic centimeters (cc) of chlorobenzene. The catalyst employed was a mixture of tungsten hexachloride at 0.0002 mole, ethyl aluminum sesquichloride at 0.002 mole, and the amine compound at 0.0004 mole (the amine compounds are set forth in the table below). The operation conditions were one hour reaction time at room temperature at ambient pressures. The amine compound, the conversion in mole percent and the selectivity to the various propylene dimers are set forth in the table below. In the table --

4M means 4-methylpentenes
DMB1 means 2,3-dimethyl-1-butene
2M1P means 2-methyl-1-pentene
DMB2 means 2,3-dimethyl-2-butene
2M2P means 2-methyl-2-pentene

| Exp No | Nitrogen Ligand | Mole % Conv | SELECTIVITY IN MOLE PERCENT TO DIMERS | | | | |
|---|---|---|---|---|---|---|---|
| | | | 4M | DMB1 | 2M1P | 2M2P | DMB2 |
| 1 | methylamine | 41 | — | 6.4 | 6.4 | — | — |
| 2 | n-butylamine | 49 | — | 14.2 | 8.9 | — | — |
| 3 | cyclopentylamine | 48 | 5.6 | 37 | 26 | — | — |
| 4 | cyclohexylamine | 44 | 7.1 | 50.9 | 41.9 | — | — |
| 5 | aniline | 75 | 3 | 64 | 34 | — | — |
| 6 | 2-methylaniline | 75 | 7.5 | 67 | 23 | — | — |
| 7 | 4-methylaniline | 73 | 7.6 | 66 | 26 | — | — |
| 8 | 3-butylaniline | 95 | 3.8 | 44 | 11 | — | — |
| 9 | 4-methoxyaniline | 40 | 6.5 | 35.8 | 32.6 | — | — |
| 10 | 2-nitroaniline | 33.6 | — | 6.7 | trace | — | — |
| 11 | 2,4-dimethylaniline | 78.9 | 10.2 | 63 | 22.6 | — | — |
| 12 | 3,5-dimethylaniline | 77 | 6.8 | 59.8 | 29.7 | — | — |
| 13 | 2,6-dimethylaniline | 53 | 18.7 | 32.3 | 7.4 | — | — |
| 14 | 2,6-dimethyl-4-bromoaniline | 56 | 5.4 | 17.9 | 3.5 | — | — |
| 15 | 2-aminonaphthalene | 42.8 | 5.1 | 43.7 | 18.8 | — | — |
| 16 | 4-methyl-N-methylaniline | 69.7 | 11 | 50.5 | 25.3 | — | — |
| 17 | dibutylamine | 28 | 10.5 | 41.5 | 27.8 | — | — |
| 18 | 4-methylpiperidine | 75 | 0 | 9.9 | 8.5 | — | — |
| 19 | triethylamine | 15.3 | 0 | 10.7 | 7.0 | — | — |
| 20 | N,N-dimethylaniline | 94 | — | — | — | — | — |
| 21 | 4-chloroaniline | 53 | trace | 43.3 | 28.7 | — | — |

EXAMPLE II

To illustrate the codimerization characteristics of this process, the following experiment was conducted: To 40 cubic centimeters of chlorobenzene saturated with ethylene was added a catalyst of tungsten hexachloride, aniline and ethylaluminum sesquichloride in moles of W/N/Al of 0.0002/0.0004/0.002. The reaction proceeded at room temperature for 30 minutes.

There was obtained 100 mole percent conversion of ethylene with 37 mole percent selectivity for 1-butene; 6.8 mole percent selectivity for cis 2-butene; 7.5 mole percent selectivity for trans 2-butene; 17.4 mole percent selectivity for 3-methyl-1-pentene and 24 mole percent selectivity for 2-ethyl-1-butene. The formation of the 3-methyl-1-pentene and the 2-ethyl-1-butene definitely indicates the codimerization of ethylene with a butene which was formed by the dimerization of ethylene.

Other olefins can be dimerized or codimerized to give results similar to those in the examples above. Representative of the olefins which may be dimerized or codimerized in accordance with this invention are ethylene, propylene, 1-butene, 1-pentene, 1-octene and the like, as shown in the following examples.

EXAMPLE III

Thirty-one grams of 1-pentene were reacted with a continuous supply of ethylene in the presence of chlorobenzene as a solvent using as a catalyst 0.15 millimoles of tungsten hexachloride, 0.30 millimoles of 2,6-dimethylaniline and 2.4 millimoles of diethylaluminum chloride at about 45°C. A conversion of 33 percent by weight of 1pentene was obtained. Vapor phase chromatography indicated the product of the codimerization to be mainly C-7 olefins.

EXAMPLE IV

An experiment such as Example III was conducted except propylene was substituted for 1-pentene. The results indicated that mixtures of C-5 olefins or methylbutenes were formed.

EXAMPLE V

Thirty-five grams of 1-octene were reacted with a catalyst comprising 0.05 millimoles of $WCl_6$, 0.1 millimoles of 2,4,6-trichloroaniline and 1.0 millimoles of ethylaluminum dichloride at 60°C. About 68 percent by weight of the 1-octene was converted, with a selectivity to C-16 olefins of about 80 percent.

EXAMPLE VI

In the following series of experiments, about 2 moles of propylene were pressured into a 300 milliliter stainless steel autoclave. The temperature was raised to 60°C. Using nitrogen, 0.1 millimole of tungsten hexachloride, 0.2 millimole of the amines set forth in the table, followed by 1.0 millimole of ethylaluminum dichloride were pressured into the autoclave. The propylene was allowed to react for 1 hour. The results and selectivity are set forth in the table in which --

4MP means 4-methylpentene
DMB1 means dimethylbutene-1
2M1P means 2-methyl-1-pentene
2M2P means 2-methyl-2-pentene
DMB2 means dimethylbutene-2

| Exp No | Nitrogen Ligand | Mole % Conv | SELECTIVITY IN MOLE PERCENT TO DIMERS | | | | |
|---|---|---|---|---|---|---|---|
| | | | 4MP | DMB1 | 2M1P | 2M2P | DMB2 |
| 1 | 2,6-dichloro-4-fluoro-aniline | 55 | 11 | 49 | 38 | 0.6 | 0.6 |
| 2 | 2,4-difluoro-aniline | 74 | 10 | 50 | 34 | 2.5 | 1.1 |
| 3 | 2,4,6-trichloro-aniline | 53 | 8.3 | 76 | 10 | 1.4 | 1.6 |
| 4 | n-butyl-amine | 26 | 12 | 49 | 35 | 0.5 | 0.8 |
| 5 | N-methyl-aniline | 10 | 34 | 21 | 1.6 | 11 | 1.7 |
| 6 | 2,6-dibromo-4-chloroaniline | 45 | 16 | 59 | 5.4 | 3.2 | 9.5 |
| 7 | 2-trifluoromethylaniline | 37 | 16 | 54 | 17 | 2.7 | 1.7 |
| 8 | 2,4,6-tribromo-aniline | 47 | 8.3 | 77 | 4.9 | 0.2 | 2.6 |
| 9 | aniline | 73 | 7.0 | 61 | 24 | 1.1 | 1.4 |

As an embodiment of this invention is the method for dimerizing olefins containing from 3 to 8 carbon atoms or codimerizing the same with ethylene which comprises subjecting said olefins to a catalyst comprising a mixture of (1) a tungsten salt selected from the group consisting of tungsten hexahalides and tungsten oxyhalides, (2) a reducing agen selected from the group defined by the formulae:

$$R_nMX_{3-n}$$

and $$R_3M_2X_3$$

wherein $n$ is at least one and not more than two, X is a halogen and R is an alkyl radical containing from one to 10 carbon atoms; and M is selected from boron, aluminum, gallium and indium; and (3) a ligand of the formula:

$$NR'R''R'''$$

wherein R' and R'' are selected from the group consisting of hydrogen, alkyl, cycloalkyl, aryl, alkenyl and alkaryl; R''' is selected from the group of hydrogen, alkyl and alkenyl and R', R'' and R''' may contain from 1 to 20 carbon atoms when not hydrogen, and when R'R" and R''' are hydrocarbon, the hydrogen atoms attached to the carbon atoms may be mono or polysubstituted by at least one member of the group selected from halogen, amino, nitro, cyano, carboxy and carboalkoxy and two members of R', R" and R''' may be joined by carbon-carbon bonds to form a part of a heterocyclic saturated ring, in which the molar ratio of the ligand of (3) to the tungsten salt of (1) varies from about 1.5/1 to about 2.5/1 and the molar ratio of the reducing agent of (2) to the tungsten salt of (1) ranges from about 8/1 to about 30/1.

While certain representative embodiments and details have been shown for the purpose of illustrating the invention, it will be apparent to those skilled in this art that various changes and modifications may be made therein without departing from the spirit or scope of the invention.

What is claimed is:

1. The method for dimerizing α-olefins containing from 3 to 8 carbon atoms or codimerizing α-olefins containing from 3 to 8 carbon atoms with ethylene which comprises subjecting said olefins to a catalyst consisting essentially of a mixture of (1) a tungsten salt selected from the group consisting of tungsten hexahalides and tungsten oxyhalides, (2) a reducing agent selected from the group defined by the formulae

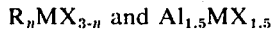
$R_nMX_{3-n}$ and $Al_{1.5}MX_{1.5}$ wherein $n$ is 1 or 2, X is a halogen, R is an alkyl radical containing from 1 to 10 carbon atoms and M is selected from boron, aluminum, gallium and indium and (3) a ligand of the formula

NR'R"R''' wherein R' and R" are selected from the group consisting of hydrogen, alkyl, cycloalkyl, aryl, alkenyl and alkaryl; R''' is selected from the group of hydrogen, alkyl and alkenyl and R', R" and R''' contain up to 20 carbon atoms and can be substituted by at least one member of the group consisting of halogen, amino, nitro, cyano, alkoxy, carboxy and carboalkoxy or R" and R''' join together by carbon-carbon bonds to form a heterocyclic saturated ring, in which the molar ratio of the ligand of (3) to the tungsten salt of (1) is from about 1.5/1 to about 2.5/1 and the molar ratio of the reducing agent of (2) to the tungsten salt of (1) is from about 8/1 to about 30/1.

2. The method according to claim 1 in which the reducing agent is ethylaluminum sesquichloride.

3. The method according to claim 1 in which the tungsten salt is tungsten hexahalide.

4. The method according to claim 1 in which the ligand is aniline or a substituted aniline.

5. The method according to claim 1 in which propylene is dimerized.

6. The method according to claim 1 in which propylene is dimerized by means of a catalyst comprising (1) tungsten hexachloride, (2) ethylaluminum sesquichloride and (3) aniline or an alkyl substituted aniline.

7. The method according to claim 1 in which ethylene and 1-butene are codimerized.

8. The method according to claim 1 in which the catalyst is a mixture of (1) tungsten hexahalide, (2) ethylaluminum sesquichloride and (3) a ligand of the formula N R' R" R''' wherein R' and R''' are hydrogen and R" is aryl or alkaryl.

* * * * *